F. CONRAD.
REGULATOR FOR ELECTRICAL CIRCUITS.
APPLICATION FILED FEB. 3, 1910.

1,146,926.

Patented July 20, 1915.
2 SHEETS—SHEET 1.

WITNESSES:
C. L. Belcher
Otto J. Schairer

INVENTOR
Frank Conrad
BY
Wesley G. Carr
ATTORNEY

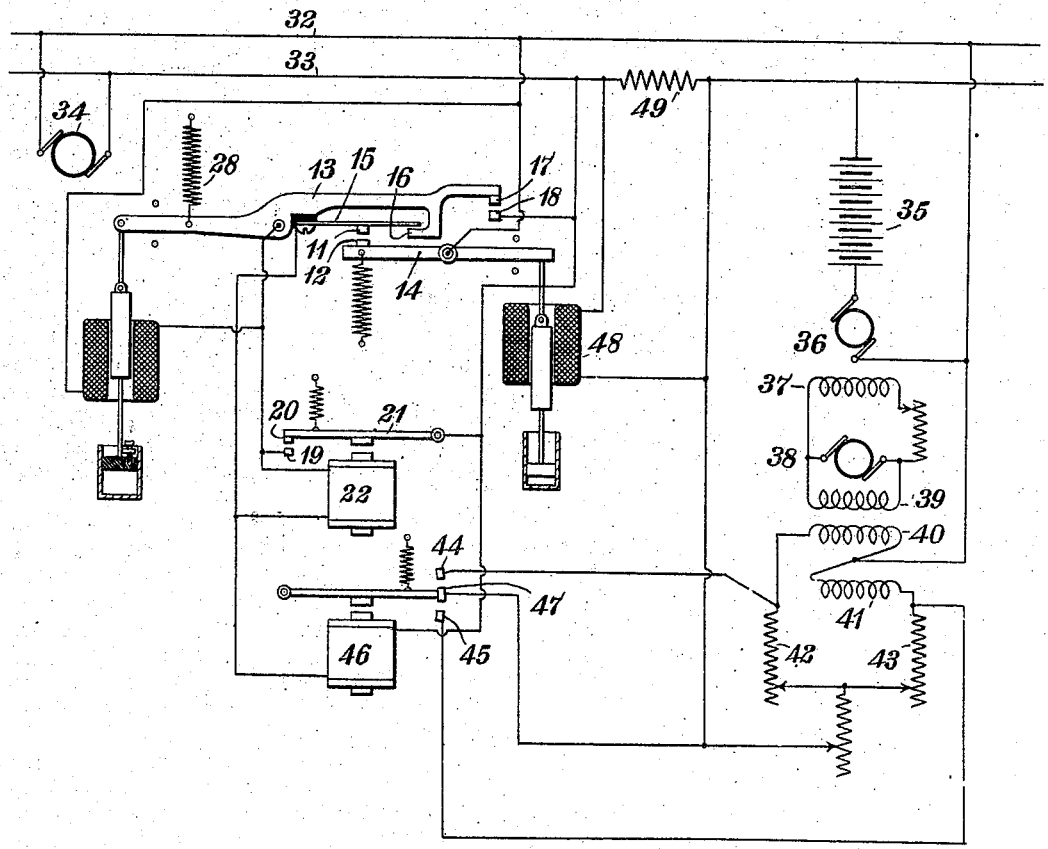

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

REGULATOR FOR ELECTRICAL CIRCUITS.

1,146,926.  Specification of Letters Patent.  Patented July 20, 1915.

Application filed February 3, 1910. Serial No. 541,786.

*To all whom it may concern:*

Be it known that I, FRANK CONRAD, a citizen of the United States, and a resident of Swissvale, in the county of Allegheny and State of Pennsylvania, have invented a new and useful Improvement in Regulators for Electrical Circuits, of which the following is a specification.

My invention relates to regulators for electrical circuits and particularly to such regulators as are adapted to maintain the voltage of a circuit substantially constant or to govern the operation of a booster that is employed in connection with a secondary battery.

The object of my invention is to provide a regulator, of the character indicated, that shall be reliable in operation and that shall always effect the desired correction or adjustment without the action known as "pumping" or "hunting".

Figure 1:
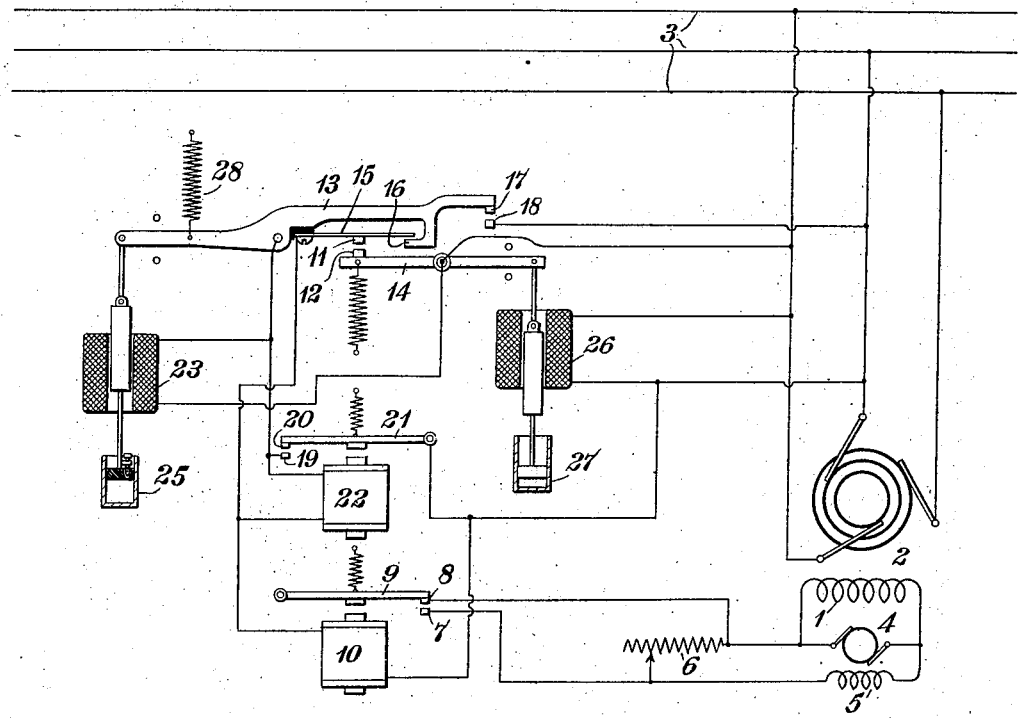
Figure 2:
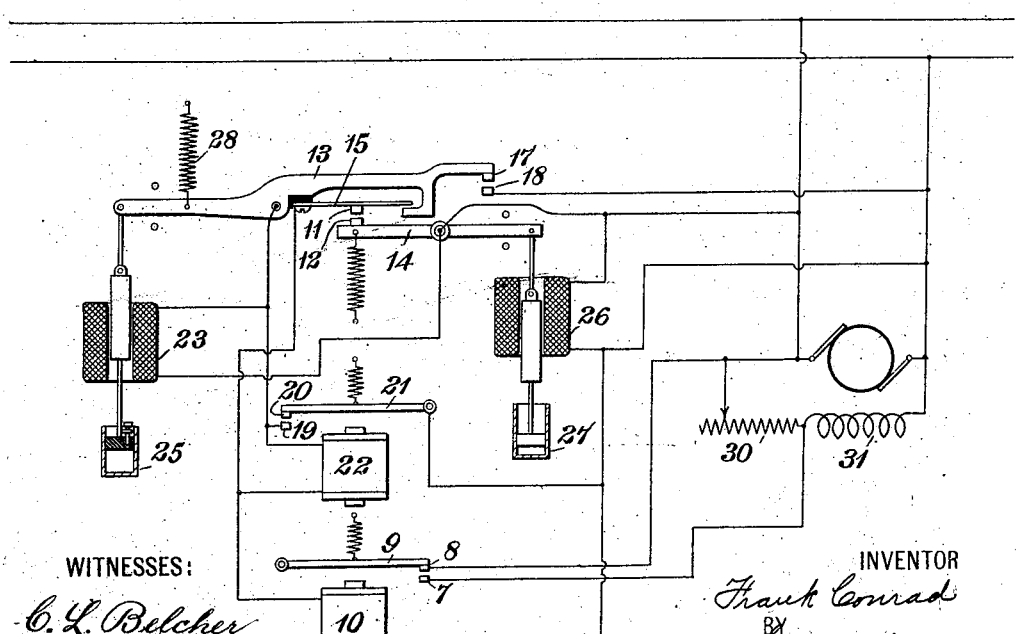

Figure 1 of the accompanying drawings is a diagrammatic view of a system embodying my invention as applied to the regulation of the voltage of an alternating current generator. In Fig. 2, the invention is applied to the regulation of a direct current generator, and in Fig. 3 it is applied to the regulation of a booster that is employed in connection with a battery.

In Fig. 1, the field magnet winding 1 of an alternating current generator 2, that is connected to a distributing circuit 3, is supplied with exciting current from an exciter 4 having a shunt-excited field magnet winding 5 in series with which is a resistance 6.

Connected in shunt to the resistance 6, is a pair of relatively movable contact terminals 7 and 8, the contact terminal 8 being carried by the movable armature 9 of a relay having an operating magnet winding 10, the circuit of which is governed by a pair of coöperating movable contact terminals 11 and 12 that are carried, respectively, by levers 13 and 14.

The contact terminal 11 is mounted upon a resilient arm or member 15 that is attached to the lever 13 and is insulated therefrom, a stop 16 being provided on the lever 13 for the outer free end of the arm 15. The lever 13 is also provided with a contact terminal 17 that is adapted to make and break contact with a stationary contact terminal 18 which is connected to one terminal of the generator 2. The contact terminal 17 is electrically connected to the lever 13, and the lever is, in turn, connected to a stationary contact terminal 19, of a relay that comprises also an armature 21, a contact terminal 20 mounted thereon and connected to one terminal of the generator 2, and an electro-magnet winding 22, one terminal of which is connected to the contact terminal 19 and the other terminal of which is connected to the arm 15. The circuit of the magnet winding 22 is governed, therefore, not only by the contact terminals 17 and 18, but also by the contact terminals 11 and 12.

The lever 13 is operated, against the tension of a spring 28, by means of an electro-magnet winding 23 that is connected between one terminal of the generator 2 and the lever 13, so that its circuit is governed primarily by the contact terminals 17 and 18 and secondarily by the contact terminals 19 and 20. The operation of the lever 13 is delayed by means of an adjustable dash pot 25, the retardation afforded by which is equal or proportional to the delay in the rise of the generator field strength to its full value.

The lever 14 is actuated by means of an electro-magnet winding 26 which is connected between terminals of the generator 2, a dash pot 27 being provided for dampening the movements of said lever. The disposition and adjustment of the parts is such that the contact members 11 and 12 will always engage before, and become disengaged after, the terminals 17 and 18.

In the operation of the regulator, the members of the several sets of coöperating contact terminals are caused to alternately make and break contact with each other and thus govern the effective value of the field strength of the exciter, which depends upon the relation of the periods during which the resistance 6 is shunted to the periods during which it is not shunted. The resistance 6 is so adjusted that, when the load and voltage upon the circuit 3 are normal, the periods during which it is shunted shall be equal to the periods during which it is not shunted, which means that the terminals 7 and 8 will be in engagement and out of engagement for equal periods of time.

The desired result is obtained in the following manner: With the various contact members occupying the positions shown, the resistance 6 is included in the circuit of the field magnet winding 5, with the result that the field of the exciter is weakened and its voltage correspondingly diminished. This, in turn, reduces the field strength and the voltage of the generator 2, and the magnet 26 accordingly exerts a slightly decreased pull upon its armature and the contact terminal 12 is raised slightly toward the terminal 11. Also, under the conditions illustrated, the circuit of the magnet winding 23 is open and the spring 28 moves the lever 13 to effect engagement of the contact terminals 11 and 12, the movement of the lever being delayed by the dash pot 25. Engagement of the terminals 11 and 12 establishes a circuit for the relay magnet winding 10 from one terminal of the generator to another by way of devices 14, 12, 11, 15 and 10. Engagement of the terminals 7 and 8 is caused by the magnet 10, when energized, and the resistance 6 is then shunted, the result being that the field strength and the voltage of both the exciter and the generator are increased. The increase of the generator voltage causes the pull of the magnet 26 upon its core to increase and thus move the contact terminal 12 away from the terminal 11. However, since the currents in the field magnet windings of the exciter and the generator lag considerably behind the applied voltages, the voltage of the generator will not respond immediately or promptly to the regulating effect caused by the shunting of the resistance 6, so that, if the separation of the contact terminals 11 and 12 were not effected by the winding 26, the increase of the generator voltage would be excessive by the time the current in the generator field magnet winding had risen to its full value. In order, therefore, that the separation of the contact terminals 11 and 12 may be effected sooner than such separation can be effected by the winding 26 alone, the winding 23 is provided for operating the lever 13 in opposition to the spring 28, and the auxiliary contact members 17 and 18 are provided for establishing its circuit.

As before stated, the arrangement and disposition of parts are such that the contact members 11 and 12 will always be caused to engage before the member 17 is brought into engagement with the member 18, and also such that the member 17 will be disengaged from the member 18 before the members 11 and 12 become disengaged. Thus, a short period after the contact members 11 and 12 engage, and, consequently, a short period after the shunting of the resistance 6 by the contact terminals 7 and 8, the circuit of the winding 23 is established and it then exerts a pull which tends to separate the contact terminals 11 and 12, as well as the members 17 and 18. In order that the winding 23 may continue to exert a pull after the separation of the contact members 17 and 18 and until separation of the members 11 and 12, the relay device 19—20—21—22 is provided, the circuit of the magnet winding 22 of which is established upon engagement of the main and auxiliary contact members 11 and 12, and 17 and 18, respectively. Upon establishment of the circuit of the winding 22, the contact members 19 and 20 establish a supplemental circuit for the winding 23 in shunt to the circuit that includes the members 17 and 18. A similar supplementary circuit is also established for the relay magnet winding 22. Thus, the circuits of the magnet windings 22 and 23 remain intact after the separation of the contact members 17 and 18 and until separation of the contact members 11 and 12, the magnet 23 continuing, during this period, to exert a pull which tends to separate the contact terminals 11 and 12. The movements of the lever 13 are delayed by the dash pot 25 to correspond to the delay in the rise of the current in the generator field winding to its full value, and, consequently, the separation of the contact members 11 and 12, as well as that of the contact members 7 and 8, occurs at just the correct time for preventing the field current and voltage of the generator from rising materially above the correct value. Upon separation of the contact members 7 and 8, the resistance 6 is again included in the circuit of the field winding 5, and the exciter and generator voltages are again diminished, with the result that the winding 26 exerts a diminished pull upon its armature, and the contact terminal 12 is, accordingly, slightly raised. The spring 28 again causes the contact terminal 11 to move downwardly, but such movement is delayed by the dash pot 25 to correspond to the lowering of the values of the field current and voltage of the generator. Thus, reëngagement of the contact members 11 and 12 occurs sooner than it would occur if the magnet 26 were relied upon alone to effect such engagement, and it also occurs at just the correct time for obtaining the desired voltage adjustment of the generator. The regulator continues to operate by causing the various sets of contact members to engage and be disengaged alternately, and the exciter field strength and voltage accordingly fluctuate to a slight degree, the generator field strength and voltage also fluctuating somewhat, but to a much less degree. In fact, the fluctuations of the generator voltage are almost imperceptible.

Under normal conditions of the circuit, the regulator will preferably be so adjusted that the contact members 11 and 12 and also the members 7 and 8 will engage and be disengaged for equal periods of time. If, however, there is a heavy load upon the distributing circuit, which tends to reduce the voltage, and which requires a stronger excitation of the generator field for the purpose of maintaining the voltage of the circuit substantially constant or at its normal value, it will be understood that the contact members 11 and 12, and also the members 7 and 8, should engage for longer periods of time than they remain out of engagement, in order that the resistance 6 may be shunted for greater periods of time than it is included in the circuit of the exciter field winding. This result is effected by the magnet winding 26, which being slightly less energized on account of reduced voltage of the distributing circuit, permits the contact member 12 to occupy a somewhat raised position. Accordingly, engagement of the contact member 11 with the member 12 occurs sooner and is maintained somewhat longer, than when the load on the circuit is normal, the resiliency of the arm 15 on which the member 11 is mounted permitting such prolonged engagement. On the other hand, if the load upon the circuit is less than normal, reverse conditions are caused to prevail in a manner which will be readily understood from the foregoing description.

In the case of direct-current, shunt-excited generators, a regulating resistance 30 may be included directly in the circuit with the field magnet winding 31 of the generator, as illustrated in Fig. 2, and the relay 7—8—9—10 may be adapted to govern the said resistance, as described in connection with Fig. 1, the remainder of the operation of the regulator being also the same as that of Fig. 1. The regulator may also be employed for the purpose of regulating the load upon a generator that supplies a circuit in connection with a battery and a booster, as illustrated in Fig. 3. In this figure, the circuit 32—33 is supplied with current from a generator 34, a battery 35 and a booster 36, being connected in series with each other across said circuit. The field magnet winding 37 of the booster is supplied with current from an exciter 38 that is provided with a main shunt field winding 39 and two auxiliary opposing field windings 40 and 41, in series with which are included resistances 42 and 43, respectively. A common terminal of the auxiliary field windings 40 and 41 is connected to the circuit 32—33, and the other terminals are connected, respectively, to stationary contact members 44 and 45 of a relay device that comprises an operating magnet winding 46, and a movable contact member 47, which is vibrated between the stationary contact members 44 and 45 by the magnet 46 and is connected to a common terminal of the resistances 42 and 43.

The remaining structural features of the regulator are the same as those of the regulators of Figs. 1 and 2, and the electrical connections of the parts are also substantially the same, one variation, however, consisting in the connection of the magnet winding 48—which corresponds to the magnet winding 26 of Fig. 1—in shunt to a resistance 49 that is included in series with distributing circuit conductor 33, so that it receives current which is proportional, in amount, to that supplied to the circuit 32—33 by the generator 34.

It will be understood that, if the load upon the circuit 32—33 is such that it can be supplied by the generator 34 alone, and the battery 35 neither receives nor discharges current, the booster voltage should be substantially zero. This result is secured, as in the system of Fig. 1, by causing the contact members 11 and 12 to engage and be disengaged for equal periods of time, which, in turn, causes the contact member 47 to engage the members 44 and 45 for equal periods of time. The resistances 42 and 43 are thus shunted for equal periods, and the auxiliary field windings 40 and 41 of the exciter are energized for equal periods, with the result that the exciter voltage fluctuates very slightly, its mean value, however, being zero. The field strength of the booster also fluctuates somewhat, but to a lesser degree, and the slightly fluctuating booster voltage equally supplements and opposes that of the battery, so that it does not deliver current to the circuit. If, however, the load upon the circuit 32—33 is greater than that which can be carried by the generator 34 alone, a somewhat increased amount of current will traverse the resistance 49 and also the regulator magnet winding 48, thus causing the contact members 11 and 12 to be disengaged for longer periods of time than they are engaged, and also causing the contact member 47 to engage the member 44 for longer periods than it engages the member 45. This, in turn, shunts the resistance 42 for longer periods than the resistance 43 is shunted, and the field winding 40 predominates over the winding 41, and the exciter 38 is thus caused to generate a voltage of such direction that the booster voltage supplements that of the battery 35 and enables the battery to discharge current to the line and thereby assist the generator in carrying the load. If the load upon the distributing circuit is light, a diminished amount of current will traverse the resistance 49, and also the regulator magnet winding 48. The contact members 11 and 12 will then engage for longer periods than they are disengaged, and the contact member 47 will engage the member 45 for longer periods than it engages the member 44. The resistance 43 is thus shunted for longer periods than the resistance 42, and the field winding 41 predominates over the winding 40 and causes the exciter voltage to be of such direction and value that the booster voltage will oppose the battery voltage sufficiently to cause a charging of the battery. The regulating action is such, under all conditions and load, that the booster voltage will be of such direction and value as to cause the battery 35 to discharge, or charge, or float upon the line, according to the condition of the load, and in such a manner that the load carried by the generator 34 will remain substantially constant or, at least, will not exceed a predetermined value. It will, of course, be understood that the structural details and circuit connections of the regulator are susceptible of considerable modification, and that the regulator may be employed and its principles applied under other conditions than those described and illustrated, and wherever the same may be found of utility or advantage, without departing from the spirit of the invention.

I claim as my invention:

1. An electrical regulator comprising a pair of main coöperating movable contact members, one of which is resiliently mounted, operating windings for the said contact members, an auxiliary contact member also operated by one of said windings and governing its circuit, and a relay having an operating winding the circuit of which is governed by the main and auxiliary contact members, the said relay being provided with a contact member that establishes and maintains a supplementary circuit for the operating winding of the auxiliary contact member until disengagement of the main contact members.

2. In an electrical regulator, the combination with a pair of main coöperating movable contact members one of which is resiliently mounted, operating windings for the said contact members, auxiliary contact members one of which is actuated by one of said windings and governs its circuit, and means for retarding the movements caused by the winding that operates the auxiliary contact member, of a relay having a winding the circuit of which is governed by the main and auxiliary contact members, the said relay establishing a supplemental circuit for the winding that operates one of the auxiliary contact members and for its own winding upon engagement of the main and auxiliary contact members, and for maintaining said supplemental circuits until separation of the main contact members.

3. In an electrical regulator, the combination with a pair of main coöperating movable contact members one of which is resiliently mounted, operating windings for said contact members, a pair of auxiliary contact members one of which is operated by one of said windings and governs its circuit, the main contact members being arranged to engage before and be disengaged after the auxiliary contact members, of a relay device comprising a winding the circuit of which is governed by the main and auxiliary contact members, the said relay device establishing a supplemental circuit for the winding that operates one of the auxiliary contact members upon engagement of the main and auxiliary contact members, and maintaining the said supplemental circuit until separation of the main contact members occurs.

4. In an electrical regulator, the combination with a pair of main coöperating movable contact members, operating windings for said contact members, a pair of auxiliary contact members one of which is operated by one of said windings and governs its circuit, the main contact members being arranged to engage before and be disengaged after the auxiliary contact members, of a relay device comprising a winding the circuit of which is governed by the main and auxiliary contact members, the said relay device establishing a supplemental circuit for the winding that operates one of the auxiliary contact members upon engagement of the main and auxiliary contact members, and maintaining the said supplemental circuit until the separation of the main contact members occurs.

5. An electrical regulator comprising a pair of main coöperating movable contact members that normally tend to engage, a continuously energized winding for actuating one of said members in response to electrical variations in the circuit to be regulated, an intermittently energized actuating winding for the other member, a pair of auxiliary contact members one of which is actuated by the intermittently energized winding and governs the circuit of said winding, the auxiliary contact members engaging and disengaging before the main contact members, and means for establishing a supplemental circuit for the intermittently energized actuating winding upon engagement of the main and auxiliary contact members and for maintaining said supplemental circuit until disengagement of the main contact members occurs.

6. An electrical regulator comprising a pair of coöperating movable contact members, means for causing said members to engage, a continuously energized winding for actuating one of said members, and an intermittently energized winding for actuating the other member in opposition to said means the circuit of which is governed by the said members jointly, the said parts coöperating to cause continuous vibration of the contact members into and out of engagement.

7. An electrical regulator comprising a pair of coöperating movable contact members, means for causing said members to engage, a continuously energized winding for actuating one of said members, an intermittently energized winding for actuating the other member in opposition to said means the circuit of which is governed by the said members jointly, the said parts coöperating to cause continuous vibration of the contact members into and out of engagement, and means for retarding the movements of the member that is actuated by the intermittently energized winding.

8. An electrical regulator comprising two movable contact-carrying members, a continuously and an intermittently energized actuating winding for the respective members, the circuit of the intermittently energized winding being governed by the said members, and means for establishing a temporary supplemental circuit for the intermittently energized winding.

9. An electrical regulator comprising two movable contact-carrying members, a continuously and an intermittently energized actuating winding for the respective members, the circuit of the intermittently energized winding being governed by the said members, means for establishing a tempory supplemental circuit for the intermittently energized winding, and means for retarding the movements of the member that is actuated by the intermittently energized winding.

10. The combination with a generator, of a regulator for adjusting its field strength comprising a pair of coöperating movable contact members, means tending to cause said members to engage a continuously energized winding for actuating one of said contact members in response to electrical variations in the circuit supplied by the generator, an intermittently energized actuating winding for the other contact member, and means for retarding the movements caused by the intermittently energized winding similarly to the current retardation in the generator field circuit during normal operation.

11. An electrical regulator comprising a pair of main coöperating movable contact members that normally tend to engage, actuating windings for the respective members and means for retarding the movements of one of said members, a pair of auxiliary contact members one of which is operated by one of said windings and governs its circuit, the auxiliary contact members engaging subsequent to, a. disengaging in advance of, the main contact members, a relay device comprising a winding the circuit of which is governed by the main and auxiliary contact members, the said relay device establishing a supplemental circuit for the winding that operates one of the contact members upon engagement of the main and auxiliary contact members, and maintaining the said supplemental circuit until separation of the main contact members occurs.

12. An electrical regulator comprising two movable contact-carrying members, contacts carried thereby, one of which is movably mounted with respect to the member that carries it, means for acting continuously upon one of said members to cause engagement of the contacts, an intermittently energized winding acting in opposition to the said means the circuit of which is controlled by said contacts, said parts coöperating to cause continuous vibration of the contacts into and out of engagement, and a continuously energized winding for actuating the other member.

13. The combination with a dynamo-electrict machine, of a regulator for adjusting the excitation thereof comprising coöperating movable contact members, means tending to cause said members to engage, means for actuating one of said members in response to variations of the voltage of said machine, means for intermittently applying an actuating force to the other member, and means for retarding its operation similarly to the retardations of the exciting current of the said machine during normal operation.

14. The combination with a dynamo-electric machine, of a regulator for adjusting the excitation thereof comprising coöperating movable contact members, means tending to cause said members to engage, means for actuating one of said members in response to variations of the voltage of said machine, means for applying an actuating force to the other member, and means for retarding its operation similarly to the retardations of the exciting current of the said machine during normal operation.

In testimony whereof, I have hereunto subscribed my name this 27th day of Jan., 1910.

FRANK CONRAD.

Witnesses:
  OTTO S. SCHAIRER,
  B. B. HINES.

Copies of this patent may be obtained for five cents each, by addressing the "Commissioner of Patents, Washington, D. C."